Patented June 20, 1950

2,511,861

UNITED STATES PATENT OFFICE 2,511,861

PURIFICATION OF PHTHALIC ANHYDRIDE

Ralph Marotta, Malden, Mass., assignor to Monsanto Chemical Company, St. Louis, Mo., a corporation of Delaware No Drawing. Application March 18, 1948,
Serial No. 15,732

8 Claims. (Cl. 260—342.5)

The present invention relates to an improved method of purifying crude phthalic anhydrides and particularly those crude phthalic anhydrides which have been prepared by the vapor phase catalytic oxidation of naphthalene. It also relates to the preparation of a purified phthalic anhydride which is especially adapted for the manufacture of exceptionally light colored and high quality phthalic anhydride derivatives.

Crude phthalic anhydrides and particularly those which have been prepared by vapor phase catalytic oxidation of naphthalene or substituted naphthalenes generally contain varying quantities and types of reducing and other impurities which impart color and a disagreeable, often foul-smelling, odor thereto. The problem of separating phthalic anhydride from such impurities is particularly difficult in commercial operations since the quantities and nature of the impurities vary considerably from batch to batch and from day to day. The methods and processes of purifying such crude phthalic anhydrides as suggested, heretofore, are successful with certain crudes, but have not been generally successful for the purification of all types of crudes since certain quantities and types of impurities are not amenable to treatment by such prior methods and are carried over with the phthalic anhydride when it is distilled from the treated crude. Although the resutling product may have an agreeable odor and light color or even a water-white color, the presence of even small quantities of such impurities therein will effect a change in the color or odor of the product when such product is exposed to heat and/or strong ultra-violet light or even after prolonged storage in the absence of light. To overcome this difficulty, it has been generally necessary to subject the product to a further purification treatment or to carry out the original purification under such drastic conditions as to materially reduce the yield of phthalic anhydride.

For the preparation of exceptionally light colored and high quality phthalic anhydride derivatives such as alkyd resins and phthalic ester plasticizers, it is necessary to employ a phthalic anhydride which is substantially free of disagreeable odor and which is substantially colorless or water-white. Moreover, the phthalic anhydride should not substantially change in color or odor on heating or on exposure to strong ultra-violet light or even on prolonged storage in diffused light. Such a phthalic anhydride is readily obtained in a simple and efficient manner by the method of the invention as described herein.

One object of the invention is to provide a simple and efficient method of purifying all types of crude phthalic anhydrides whereby a phthalic anhydride is obtained, which is adapted for the preparation of exceptionally light colored phthalic anhydride derivatives even after prolonged storage in diffused light.

A further object of the invention is to provide an improved method of preparing a purified phthalic anhydride which is characterized by an agreeable odor and a water-white color and which is not substantially changed in color or odor on exposure to heat or strong ultra-violet light, or on prolonged storage.

Still further objects and advantages of the invention will appear from the following description and the appended claims.

The invention is practiced in general by subjecting crude phthalic anhydride to two separate chemical treatments at relatively high temperature and then physically separating the phthalic anhydride from the impurities in purified form in a suitable manner. The first of such chemical treatments is generally carried out by first heating a mixture of crude phthalic anhydride and a small proportion of an inorganic acid reacting oxidizing agent as, for example, sulfuric acid or hydrogen peroxide. Preferably, such oxidizing agent is employed in an amount substantially equivalent to that required to oxidize the reducing impurities in the crude. The mixture is generally heated at a temperature essentially above 270° C., but preferably not substantially in excess of the boiling point of phthalic anhydride at atmospheric pressure and without appreciable loss of phthalic anhydride vapor and preferably for a period of time sufficient to substantially complete the reaction between such oxidiznng agent and the reducing impurities in the crude.

The second of such chemical treatments is generally carried out by heating such mixture and a small proportion of alkali metal nitrate without appreciable loss of phthalic anhydride vapor at a temperature above about 270° C., but preferably not substantially in excess of the boiling point of phthalic anhydride at atmospheric pressure. This treatment is generally of such duration as to materially alter the volatility of the impurities to the extent that phthalic anhydride can be distilled therefrom without a carrying over of the impurities with the phthalic anhydride vapor. The purified phthalic anhydride is then separated from the mixture as by fractional distillation at sub-atmospheric pressure.

Various types of crude phthalic anhydride may be purified according to the method described herein. As examples of these may be mentioned phthalic anhydride which has been prepared by the vapor phase catalytic oxidation of naphthalene, substituted naphthalene, ortho xylene, and the like. The purification method described herein can be also be practiced on semi-refined crudes, that is, crudes which have been given one or more antecedent distillations.

The quantity and nature of the inorganic acid reacting oxidizing agents employed, the duration of the treatment and the temperature employed in the first or oxidation treatment are to a certain extent dependent upon each other and are generally dependent upon the source of the crude and the quantities and nature of impurities in the crude. In general, the quantity of such oxidizing agent required will depend also on whether the phthalic anhydride, which is to be purified, is a crude as such or whether it has been semi-refined by one or more precedent distillations.

As examples of inorganic acid reacting oxidizing agents which are employable in carrying out the practice of the invention may be mentioned sulfuric acid, nitric acid, sulfur trioxide, mixtures of sulfuric and nitric acid such as, for example, the mixtures commonly known in the art as mixed acids, hydrogen peroxide and the like. Such oxidizing agents are reduced by the reducing impurities contained in the crude and in the reduced form are readily expelled from the mixture as gases or vapors under the conditions of operation, that is, they are expelled from the mixture in their reduced state at the relatively high temperatures used. Other oxidizing agents which are readily expelled from the mixture in their reduced form or state as a gas or vapor may also be employed.

In general, it is desirable in the treatment of most crudes to employ from about 0.0035 to 0.04 mol of such oxidizing agent per mol of phthalic anhydride in the crude. When the crude contains less than the normal quantities of reducing impurities, it is possible to employ less oxidizing agent than the lower limit above indicated. On the other hand, there are crudes which contain larger amounts of reducing impurities than the normal crudes and in such instances it may be necessary to employ larger quantities of such oxidizing agent. In the oxidation treatment of any particular crude phthalic anhydride, it is preferable to employ a quantity of such oxidizing agent which is substantially equivalent to that required to oxidize substantially all of the reducing impurities in the crude without being excessive. When more oxidizing agent is employed than is required to oxidize the reducing impurities, the excess of unreacted oxidizing agent is not generally harmful or detrimental per se in respect to the phthalic anhydride. However, the effectiveness of the subsequent chemical treatment may be impaired, or the distilland or residue which is obtained on distillation of the phthalic anhydride may become viscous or difficult to distill and separation of the remaining phthalic anhydride therefrom may be extremely difficult.

The temperature at which such oxidation treatment is carried out is in general above about 270° C. and preferably at the boiling point of phthalic anhydride at atmospheric pressure. The treatment is generally completed after heating at such temperatures for a period of 1 to 3 hours although a longer time of treatment may be used, if desired. Preferably the treatment is carried out at the temperatures described for a period of time sufficient to substantially complete the reaction between such oxidizing agent and the reducing impurities in the crude.

In general, the quantity of alkali metal nitrate employed in the second chemical treatment is at least 0.0015 mol of such nitrate per mol of phthalic anhydride in the crude. However, if the purification treatment described herein is being carried out on a semi-refined phthalic anhydride, smaller quantities of alkali metal nitrate can be used and it is possible in such instances to use as little as 0.001 mol of alkali metal nitrate per mol of phthalic anhydride in the crude, particularly when there is substantially no unreacted oxidizing agent present after the first chemical treatment. A range of 0.0015 to 0.01 mol of alkali metal nitrate per mol of phthalic anhydride is preferable for the second chemical treatment of most crudes. However, larger quantities of such nitrate may be employed, if desired, although excessive quantities may yield a viscous distilland or residue upon the subsequent distillation of phthalic anhydride from the mixture. When the distilland or residuce is viscous and contains relatively large quantities of inorganic compounds the phthalic anhydride remaining therein is extremely difficult to remove by distillation.

As examples of alkali metal nitrates which are employable in the practice of the invention may be mentioned lithium nitrate, sodium nitrate, potassium nitrate, cesium nitrate and the like. Lithium nitrate and sodium nitrate are preferred for use according to the method herein described. Such alkali metal nitrates may be employed in anhydrous form or substantially anhydrous form or as a salt having water of crystallization. However, for operational reasons it is preferable to employ such nitrates substantially in the anhydrous form.

The duration of treatment with alkali metal nitrate is generally from 1 to 3 hours at the temperatures hereinbefore described. Longer periods of treatment may be used, however, if desired. In some instances the duration of treatment may be less than 1 hour as, for example, when purifying semi-refined phthalic anhydride or when larger quantities of alkali metal nitrate are employed. As a practical matter it is only necessary to carry out the second chemical treatment for a period of time sufficient to convert substantially all of the impurities to high boiling materials so that purified phthalic anhydride can be separated therefrom by fractional distillation at subatmospheric pressure, preferably below about 400 mm. of mercury absolute pressure.

A further understanding of the practice and advantages of the invention will be obtained from the following specific examples, which are intended to be illustrative and not limitative of the scope of the invention, parts and percentages being by weight unless otherwise specified.

*Example I*

Nine-tenths part of hydrogen peroxide in the form of an aqueous hydrogen peroxide solution having a specific gravity of 1.11 was introduced with agitation below the surface of molten (140° C.) crude phthalic anhydride and the resulting mixture was heated, under reflux, at a temperature of about 280° C. for a period of 2 hours. The mixture was permitted to cool to approximately 270° C. and there was added thereto 0.3 part of NaNO₃. The resultant mixture was then heated under reflux to a temperature of 285° C. for a period of 2 hours after which phthalic anhydride was distilled therefrom in suitable apparatus by fractional distillation at an absolute pressure of 230 mm. of mercury. Substantially all of the phthalic anhydride was recovered from the distilland without difficulty.

The distillate obtained by the above procedure had an agreeable odor and a color of 0–10 on the Platinum-Cobalt (Hazen) Color Standard. A sample of this product was not substantially changed in odor or color when heated at 250° C. in a Pyrex tube for 1½ hours or when exposed to strong ultra-violet light for 24 hours in a weather-o-meter and was stable without being substantially changed in color or odor, after prolonged storage in closed containers. Moreover, the product prepared by the above procedure is especially suitable for the preparation of exceptionally light colored high quality alkyd resins and phthalic ester plasticizers even after prolonged storage.

In making the test for resistance to change in color or odor on exposure to strong ultra-violet light, the purified phthalic anhydride, as obtained above, was first flaked and then placed in suitable glass tubes which were suspended in a standard device used in an accelerated weathering test. The device actually employed and the procedure of placing test specimens therein is described in A. S. T. M. test D–822–46T entitled "Tentative Recommended Practice for Operating Light and Water Exposure Apparatus." This test is found in vol. II, page 164, A. S. T. M. Standards (1946) published by American Society for Testing Materials, Philadelphia, Pa.

The Platinum-Cobalt (Hazen) Color Standard referred to herein is described at page 71, 1939 ed., of "Physical and Chemical Examinations of Paints, Varnishes, Lacquers and Color" by Henry A. Gardner, published by the Institute of Paint and Varnish Research, Washington, D. C.

Example II

Forty-two and six-tenths degree Baumé nitric acid was introduced, with agitation, below the surface of 100 parts of molten (150° C.) crude phthalic anhydride, which had been prepared by the vapor phase catalytic oxidation of napthalene, until 0.85 part of HNO₃ was added. This quantity of HNO₃ was approximately equivalent to that required to oxidize substantially all of the reducing impurities in the crude phthalic anhydride. The resulting mixture was heated under reflux at the boiling point of phthalic anhydride at atmospheric pressure for about 2 hours and then permitted to cool to about 270° C. One-tenth part of LiNO₃ was added thereto and the resulting mixture was boiled, under reflux, at atmospheric pressure for approximately 2½ hours. The mixture was then transferred to a suitable still and fractionally distilled at an absolute pressure of 300 mm. of mercury. The distilland remained fluid until substantially all of the phthalic anhydride had been separated therefrom and did not appreciably interfere with the distillation.

The purified phthalic anhydride so obtained had an agreeable odor and a color of 0–10 on the Platinum-Cobalt (Hazen) Color Standard. In addition, such phthalic anhydride remained substantially unchanged in odor or color while heated in a Pyrex tube at 250° C. for 1½ hours or when exposed to strong ultra-violet light for 24 hours in a weather-o-meter (see Example I for reference to testing device). Moreover, the product prepared by the above procedure was especially adapted for the preparation of exceptionally light-colored high quality alkyd resins and phthalic ester plasticizers even after prolonged storage.

Example III

One and four-tenths parts of $H_2SO_4$ in the form of sulfuric acid having a specific gravity of 1.84 were added, with agitation, to 100 parts of molten (200° C.) crude phthalic anhydride, which contained odor, color and reducing impurities. The quantity of $H_2SO_4$ added was approximately equivalent to that required to oxidize substantially all of the reducing impurities in the crude. The resulting mixture was heated under reflux at a temperature of about 275° C. for approximately 3 hours. To the above mixture was added 0.7 part of NaNO₃ and the resulting mixture was heated under reflux to about 280° C. for a period of approximately 1½ hours and then fractionally distilled at an absolute pressure of about 350 mm. of mercury.

The purified phthalic anhydride prepared in the above manner has substantially the same color, odor and stability characteristics and utility as that prepared by the procedure of Example I.

Example IV

A mixed acid containing 3 parts of $H_2SO_4$ to 1 part of $HNO_3$ was prepared by mixing 4.59 parts of 98% sulfuric acid and 2.15 parts of 70% nitric acid. This mixed acid was added, with agitation, to 100 parts of molten (150° C.) crude phthalic anhydride which contained reducing impurities, until 0.5 part of $HNO_3$ and 1.5 parts of $H_2SO_4$ were introduced. The quantity of $HNO_3$ and $H_2SO_4$ added was approximately equivalent to that quantity which was required to oxidize substantially all of the reducing impurities in the crude. The resulting mixture was heated under reflux at a temperature of 285° C. for about 1½ hours and was then permitted to cool to about 260° C. To the cooled mixture was added 0.4 part of KNO₃ and the resulting mixture was heated under reflux to a temperature of 285° C. for about 1¾ hours and then fractionally distilled at an absolute pressure of about 200 mm. of mercury.

The phthalic anhydride as obtained in the purified form by the above procedure has an agreeable odor and a color of 0–10 on the Platinum-Cobalt (Hazen) Color Standard. The color and odor of this product are substantially unchanged even after the product is exposed in a Pyrex tube to a temperature of 250° C. for 1½ hours or when exposed to strong ultra-violet light for 24 hours (see Example I for description of test) or even after the product was stored for prolonged periods of time, i. e. 6 months or longer. This purified product is especially adapted for the preparation of exceptionally light colored phthalic ester plasticizers and alkyd resins, even after prolonged storage.

What is claimed is:

1. A method of purifying crude phthalic anhydride which contains reducing and other impurities, which comprises heating a mixture of said crude anhydride and a small proportion of an inorganic acid reacting oxidizing agent selected from the group consisting of sulfuric acid, nitric acid, sulfur trioxide, mixtures of sulfuric and nitric acid, and hydrogen peroxide at a temperature essentially above 270° C.; adding thereto a small proportion of alkali metal nitrate; heating the resulting mixture at a temperature above 270° C. and for a period of time sufficient to permit separation of phthalic anhydride from the impurities therein by distillation; and then separating phthalic anhydride therefrom in purified form.

2. A method of purifying crude phthalic anhydride which contains reducing and other impurities, which comprises heating a mixture comprising at least 0.0035 mol of an inorganic acid reacting oxidizing agent selected from the group consisting of sulfuric acid, nitric acid, sulfur trioxide, mixtures of sulfuric and nitric acid, and hydrogen peroxide per mol of phthalic anhydride in said crude at a temperature essentially above 270° C. and for a period of time sufficient to substantially complete the reaction between said oxidizing agent and the reducing impurities in said crude; adding thereto at least 0.0015 mol of alkali metal nitrate per mol of phthalic anhydride in said crude; heating the resulting mixture at a temperature above 270° C. for a period of time sufficient to permit separation of phthalic anhydride from the impurities contained therein by distillation; and then separating phthalic anhydride therefrom in purified form.

3. A method of purifying crude phthalic anhydride prepared by the vapor phase catalytic oxidation of naphthalene, which comprises heating a mixture of said crude anhydride and from about 0.0035 to 0.04 mol of an inorganic acid reacting oxidizing agent selected from the group consisting of sulfuric acid, nitric acid, sulfur trioxide, mixtures of sulfuric and nitric acid, and hydrogen peroxide per mol of phthalic anhydride in said crude, at a temperature essentially above 270° C. and for a period of time sufficient to substantially complete the reaction between said oxidizing agent and the reducing impurities in the crude; adding thereto from about 0.0015 to 0.01 mol of alkali metal nitrate per mol of phthalic anhydride in said crude; heating the resulting mixture at a temperature above 270° C. for a period of time sufficient to permit separation of phthalic anhydride in purified form from the impurities therein by distillation; and then separating phthalic anhydride therefrom in purified form by distillation at subatmospheric pressure.

4. A method substantially according to claim 3 wherein the alkali metal nitrate is NaNO₃.

5. A method substantially according to claim 3 wherein the alkali metal nitrate is LiNO₃.

6. A method substantially according to claim 3 wherein the alkali metal nitrate is KNO₃.

7. A method of purifying crude phthalic anhydride which contains reducing and other impurities, which comprises heating a mixture of said crude anhydride and a quantity of an inorganic acid reacting oxidizing agent selected from the group consisting of sulfuric acid, nitric acid, sulfur trioxide, mixtures of sulfuric and nitric acid, and hydrogen peroxide which is sufficient to oxidize the reducing impurities in said crude at a temperature essentially above 270° C. and for a period of time sufficient to substantially complete the reaction between said oxidizing agent and the reducing impurities in said crude; adding thereto a small proportion of an alkali metal nitrate; heating the resulting mixture above 270° C. for a period of time sufficient to permit separation of phthalic anhydride in purified form from the impurities in said crude by distillation; and then separating phthalic anhydride therefrom in purified form.

8. A method of purifying semi-refined phthalic anhydrides which contain reducing and other impurities, which comprises heating a mixture of said semi-refined crude and a small proportion of an inorganic acid reacting oxidizing agent selected from the group consisting of sulfuric acid, nitric acid, sulfur trioxide, mixtures of sulfuric and nitric acid, and hydrogen peroxide at a temperature essentially above 250° C.; adding thereto at least .001 mol of alkali metal nitrate per mol of phthalic anhydride in said crude; heating the resulting mixture at a temperature above 270° C. and for a period of time sufficient to permit separation of phthalic anhydride in purified form from the impurities therein by distillation; and then separating purified phthalic anhydride therefrom by distillation at subatmospheric pressure.

RALPH MAROTTA.

REFERENCES CITED

The following references are of record in the file of this patent:

UNITED STATES PATENTS

| Number | Name | Date |
|---|---|---|
| 2,105,911 | Foster | Jan. 18, 1938 |
| 2,349,513 | Porter | May 23, 1944 |
| 2,356,449 | Engel | Aug. 22, 1944 |